US010353523B2

(12) United States Patent
Kobel et al.

(10) Patent No.: US 10,353,523 B2
(45) Date of Patent: Jul. 16, 2019

(54) PASSENGER COMMUNICATION LIGHTING

(71) Applicant: Westinghouse Air Brake Technologies Corporation, Wilmerding, PA (US)

(72) Inventors: Karl J. Kobel, Wildwood, IL (US); Timothy R. Schmidt, Wheeling, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 131 days.

(21) Appl. No.: 15/586,564

(22) Filed: May 4, 2017

(65) Prior Publication Data

US 2017/0329438 A1  Nov. 16, 2017

Related U.S. Application Data

(60) Provisional application No. 62/334,005, filed on May 10, 2016.

(51) Int. Cl.
*G06F 3/044* (2006.01)
*B60J 5/04* (2006.01)
(Continued)

(52) U.S. Cl.
CPC ............ *G06F 3/044* (2013.01); *B60J 5/0497* (2013.01); *B60K 35/00* (2013.01); *B60K 37/06* (2013.01); *B60Q 1/2669* (2013.01); *B60Q 1/2696* (2013.01); *B60Q 1/503* (2013.01); *B60Q 3/14* (2017.02); *B60Q 3/217* (2017.02); *B60Q 3/41* (2017.02); *B60Q 3/47* (2017.02); *B60Q 3/64* (2017.02); *G09F 13/005* (2013.01); *G09F 21/04* (2013.01); *G09F 23/04* (2013.01); *G09G 3/2003* (2013.01);

*H05B 37/0227* (2013.01); *B60K 2370/143* (2019.05); *B60K 2370/1446* (2019.05); *B60K 2370/161* (2019.05); *B60K 2370/186* (2019.05); *B60K 2370/188* (2019.05);
(Continued)

(58) Field of Classification Search
CPC ........ G06F 3/044; G09F 13/055; G09F 21/04; G09F 2013/222; B60Q 3/14; B60Q 3/47; B60Q 1/2669
See application file for complete search history.

(56) References Cited

U.S. PATENT DOCUMENTS 5,148,410 A    9/1992  Kuhn
5,986,561 A    11/1999 Kuruvilla et al.
(Continued)

FOREIGN PATENT DOCUMENTS

DE    102010019764 A1    11/2011
JP    2013116735 A        6/2013

*Primary Examiner* — Robert J Michaud
(74) *Attorney, Agent, or Firm* — The Webb Law Firm

(57) ABSTRACT

A passenger communication lighting display on or adjacent a touch bar on a passenger door of a transit vehicle comprises a display that can be controlled to display multiple colors continuous or blinking, and a control means causing the display to be dark when the door is closed, the display to be a first color when the operator has authorized opening, the display to flash a second color when the passenger has requested the door be opened, the display to be blinking the second color when the door is opening, the display to be continuously the second color when the door is resting in the open position, and the display to be blinking a third color while the door is closing.

17 Claims, 4 Drawing Sheets

(51) Int. Cl.
*B60K 35/00* (2006.01)
*B60Q 1/26* (2006.01)
*B60Q 1/50* (2006.01)
*G09F 13/00* (2006.01)
*G09F 21/04* (2006.01)
*G09F 23/04* (2006.01)
*G09G 3/20* (2006.01)
*H05B 37/02* (2006.01)
*B60K 37/06* (2006.01)
*B60Q 3/64* (2017.01)
*B60Q 3/217* (2017.01)
*B60Q 3/41* (2017.01)
*B60Q 3/47* (2017.01)
*B60Q 3/14* (2017.01)
*G09F 13/22* (2006.01)

(52) U.S. Cl.
CPC .... *B60K 2370/193* (2019.05); *B60K 2370/33* (2019.05); *B60K 2370/52* (2019.05); *B60K 2370/739* (2019.05); *B60K 2370/77* (2019.05); *E05Y 2400/818* (2013.01); *E05Y 2400/822* (2013.01); *E05Y 2400/85* (2013.01); *E05Y 2900/506* (2013.01); *E05Y 2900/51* (2013.01); *G09F 2013/222* (2013.01)

(56) References Cited

U.S. PATENT DOCUMENTS

| | | | |
|---|---|---|---|
| 7,208,694 B2 | 4/2007 | Urman et al. | |
| 8,791,839 B2 | 7/2014 | Citta et al. | |
| 2013/0321127 A1* | 12/2013 | Wilder | G05B 19/042 340/5.71 |
| 2014/0111705 A1* | 4/2014 | Wade | H04N 5/64 348/838 |
| 2015/0070594 A1* | 3/2015 | Trachtenberg | H04N 5/64 348/841 |
| 2015/0218870 A1* | 8/2015 | Fukui | B60R 25/20 701/49 |

\* cited by examiner

PASSENGER COMMUNICATION LIGHTING

CROSS REFERENCE TO RELATED APPLICATIONS

This application claims the benefit of U.S. Provisional Patent Application No. 62/334,005, filed on May 10, 2016, the disclosure of which is hereby incorporated by reference in its entirety.

BACKGROUND OF THE INVENTION

Field of the Invention

This invention relates to automatically operated passenger doors on transit vehicles, such as, buses and trains. More specifically, it relates to passenger communication lighting that informs a passenger standing before or passing through the doors of the status of the automatic control of the doors.

Description of Related Art

It is well-known that a vast majority of urban transit vehicles utilize a plurality of side mounted powered door systems for passenger ingress and egress. In some applications, such as underground subways, where the transit vehicles operate in a multiple vehicle configuration and further operate in a climatically controlled environment, and where the passenger generally pays first to gain access to the transit vehicle, all side door systems in every transit vehicle are being operated at every station.

In other applications, especially where transit vehicles operate above ground, the passenger may pay only upon entering the vehicle through only one side door located next to a vehicle operator while the other side doors are used predominantly for passenger egress. In such applications, it is desirable to maintain a consistent interior climatic environment of the transit vehicles for passenger comfort and minimize the effect of external environmental factors. Selectively operating side door systems decrease component wear and increase durability and reliability of such side door systems. Therefore, in such applications, it is common for a vehicle operator to selectively open certain side doors while placing other side doors in a condition enabling the passenger to open such side doors by contacting a switch device mounted either directly on the side door or in its vicinity.

The well-known switch devices used in such applications are touch bars. A touch bar, comprising a tubular member terminated by upper and lower housings at each end, enables a small range of lateral movement in any direction. Either one or both end housings contain a switch of the electromechanical nature that is activated upon movement of the tubular member caused by the passenger contact. The resulting electrical signal is used by the door drive and door controller to open the door which then enables passenger egress. Other switch devices are known that simply respond to a passengers contact with the touch bar as, for example, the vTouch (tm) electronic touch bar sold by the assignee of this application and having no moving parts.

It would be desirable if the passenger at a door was aware of the status of the door, for example, whether the operator has authorized the opening of the door and/or the passenger's request has been received. Still further, it is desirable that passengers be apprised when the door is about to open or close or is opening or closing or resting in the open or closed position.

SUMMARY OF THE INVENTION

Briefly, according to this invention, there is provided a passenger communication system for a transit vehicle, comprising: an interactive display device positioned in close proximity to one or more vehicle doors on the transit vehicle and adapted to display a visual notification to one or more passengers on the transit vehicle; and a programmable control unit electrically coupled to the interactive display device and adapted to alter the visual notification on the display device to indicate one or more states of the vehicle door representing at least one of a fully opened state, a fully closed state, or a transition state between the fully opened state and the fully closed state, where the visual notification via the interactive display device may comprise either ON or OFF in a first state when the vehicle door is fully closed; where the visual notification via the interactive display device in a second state is a controlled display in a first color when the vehicle door is authorized for opening or closing; where the visual notification via the interactive display device in a third state is a controlled display in a second color when the vehicle door is fully open; and where the visual notification via the interactive display device in a forth state is a controlled display in a third color when the one or more passengers request that the vehicle door be opened.

Briefly, according to another embodiment of this invention, there is provided a method of providing notification to one or more passengers on a transit bus via a notification system to open a vehicle door on the transit bus, comprising: receiving an authorized command at the notification system indicative of when it is safe to open a vehicle door on the transit bus; notifying to the one or more passengers via an interactive display device that the notification system is waiting to receive a passenger input indicative of a need to open the vehicle door, wherein the interactive display device adapted to provide visual notification of at least one of a readiness to receive passenger input and a confirmation of the passenger input; opening the vehicle door to allow exit of the one or more passengers upon receiving the passenger input at the interactive display device; and providing controllable visual notification via the interactive display device to the one or more passengers during the transition of the vehicle door from the fully closed position to the fully open position.

Briefly, according to yet another embodiment of this invention, there is provided a passenger communication lighting display on or adjacent a touch bar of a passenger door on a transit vehicle comprising: a display that can be controlled to display multiple colors continuous or blinking; a control device responsive to signals indicating that the door is closed, the operator has authorized the door to be opened, a passenger has requested the door be opened, the door is about to open or is opening, the door is about to close or is closing, or the door is resting in the open position, the control means to thereby cause the display to be dark when the door is closed; the display to be a first color when the operator has authorized opening; the display to flash a second color when the passenger has requested the door be opened; the display to be blinking the second color when the door is opening; the display to continuously show the second color when the door is resting in the open position; and the display to be blinking a third color while the door is closing.

Briefly, according to a still further embodiment to this invention, there is provided a computer readable medium containing program instructions for providing notification to one or more passengers on a transit bus via a notification system to open a vehicle door on the transit bus, wherein execution of the program instructions by one or more processors of a computer system cause the one or more processors to carry out the steps of: receiving an authorized command at the notification system indicative of when it is safe to open a vehicle door on the transit bus; notifying to the one or more passengers via an interactive display device controlled by the notification system and mounted proximate to the vehicle door that the notification system is waiting to receive a passenger input indicative of a need to open the vehicle door, the interactive display device adapted to provide visual notification of at least one of a readiness to receive passenger input and a confirmation of the passenger input; opening the vehicle door safely to allow exit of the one or more passengers upon receiving the passenger input at the interactive display device; and providing controllable visual notification via the interactive display device to the one or more passengers during the transition of the vehicle door from fully closed position to fully open position.

DESCRIPTION OF THE INVENTION

Figure 1:
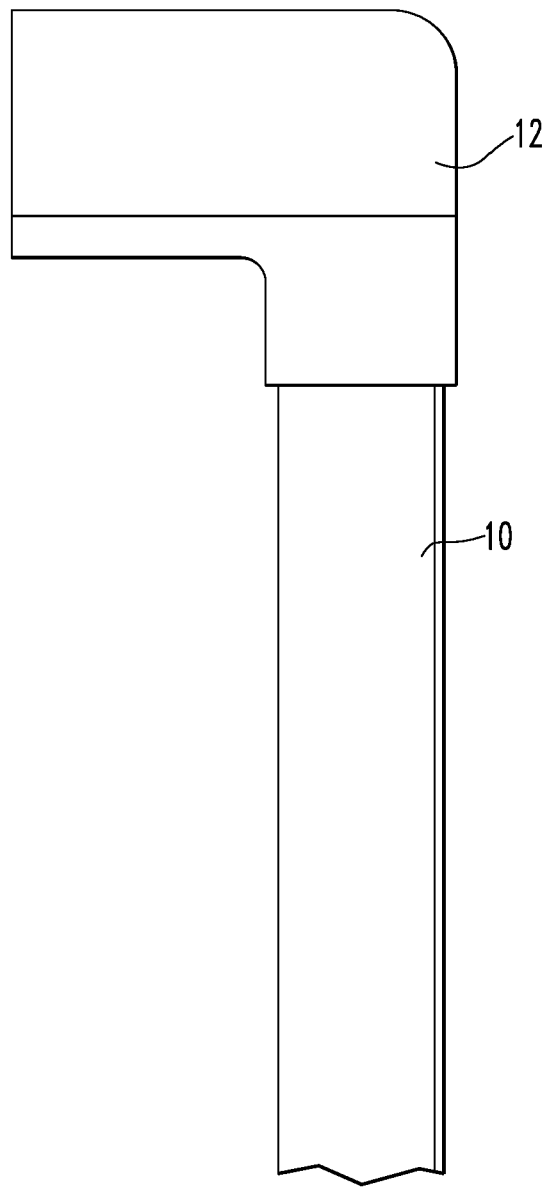
FIG. 1 is a partial side view of a touch bar on a transit vehicle wherein the display is a light bar on the face of the touch bar.
Figure 2:
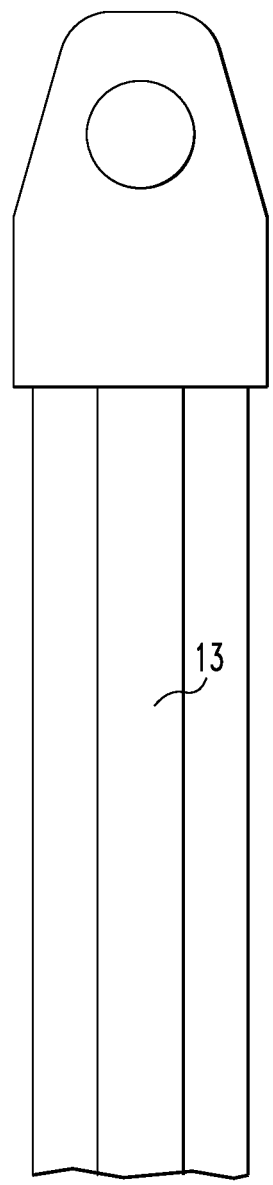
FIG. 2 is a front view of the touch bar shown in FIG. 1.

Referring to FIGS. 1 and 2, a touch bar 10 is supported by an upper housing 12 and has a light bar 13 mounted on the front thereof. The light bar incorporates lighting running the length of the bar between the top and bottom housing. Optionally, the light bar is always lit in a particular color i.e., there is no off state when the bus is in service.

Figure 5:
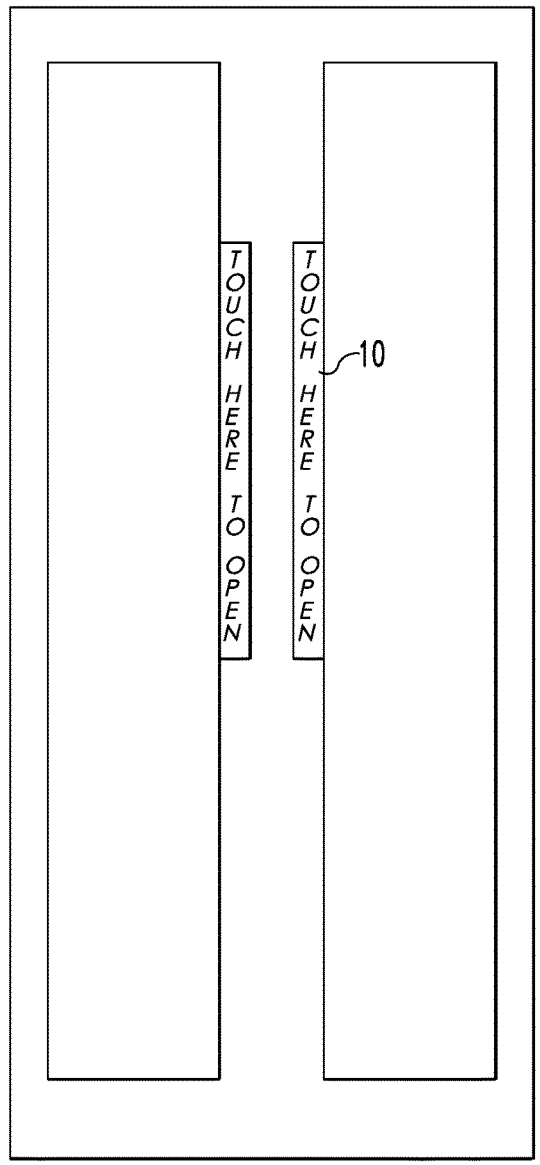
FIG. 5 is a front view of exit panels wherein the display is on the face of the touch bar.

FIG. 5 shows the placement of the touch bar 10 positioned on transit vehicle door panels. In this embodiment, the lighting is incorporated in the door panel behind a translucent lens.

Figure 3:
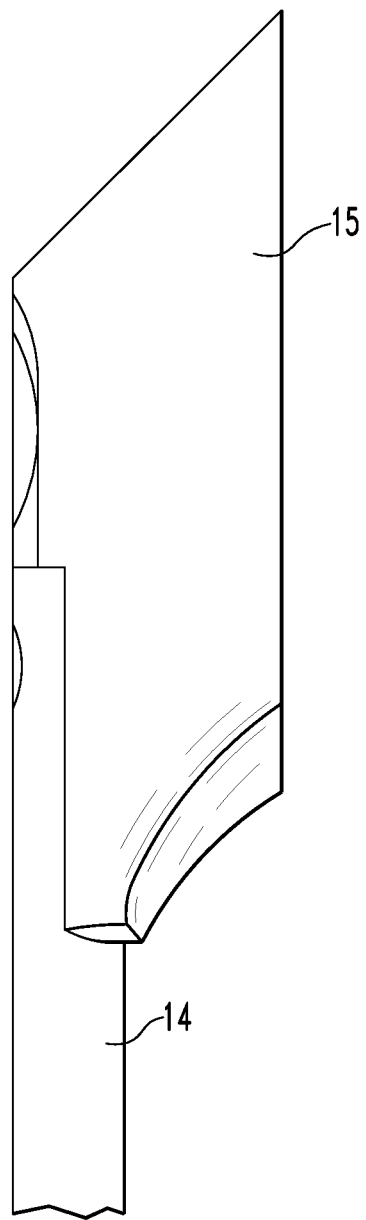
FIG. 3 is a partial side view of a touch bar on a transit vehicle wherein the display is on the end cap of the light bar on the face of the touch bar.
Figure 4:
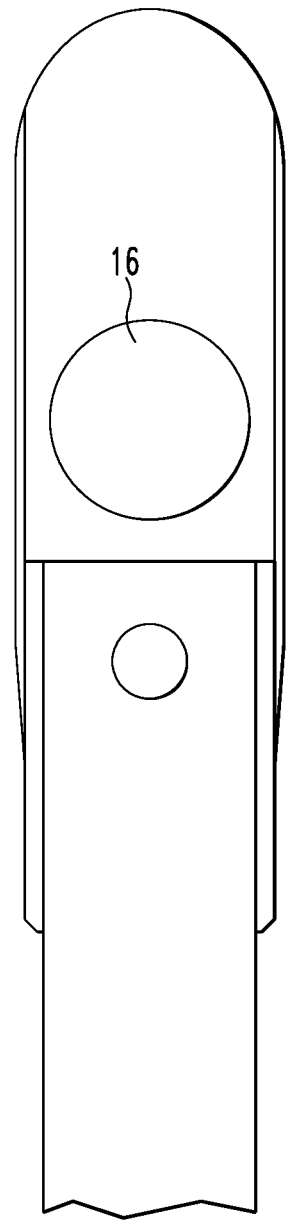
FIG. 4 is a front view of the touch bar shown in FIG. 3.

Referring to FIGS. 3 and 4, a touch bar 14 is supported by an upper housing 15 and has a light 16 mounted on the front of the upper housing.

Figure 6:
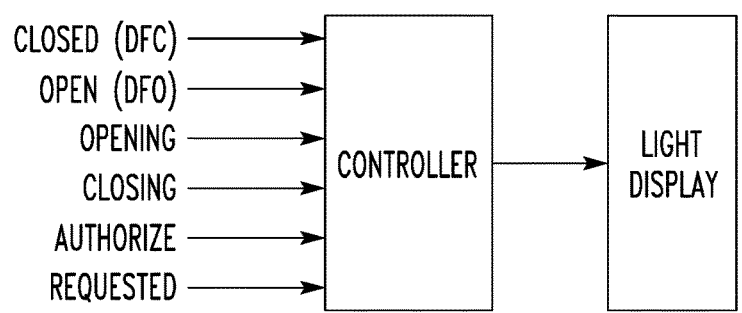
FIG. 6 is a schematic of the relation between the controller and light display with the input to the controller illustrated.
Figure 7:
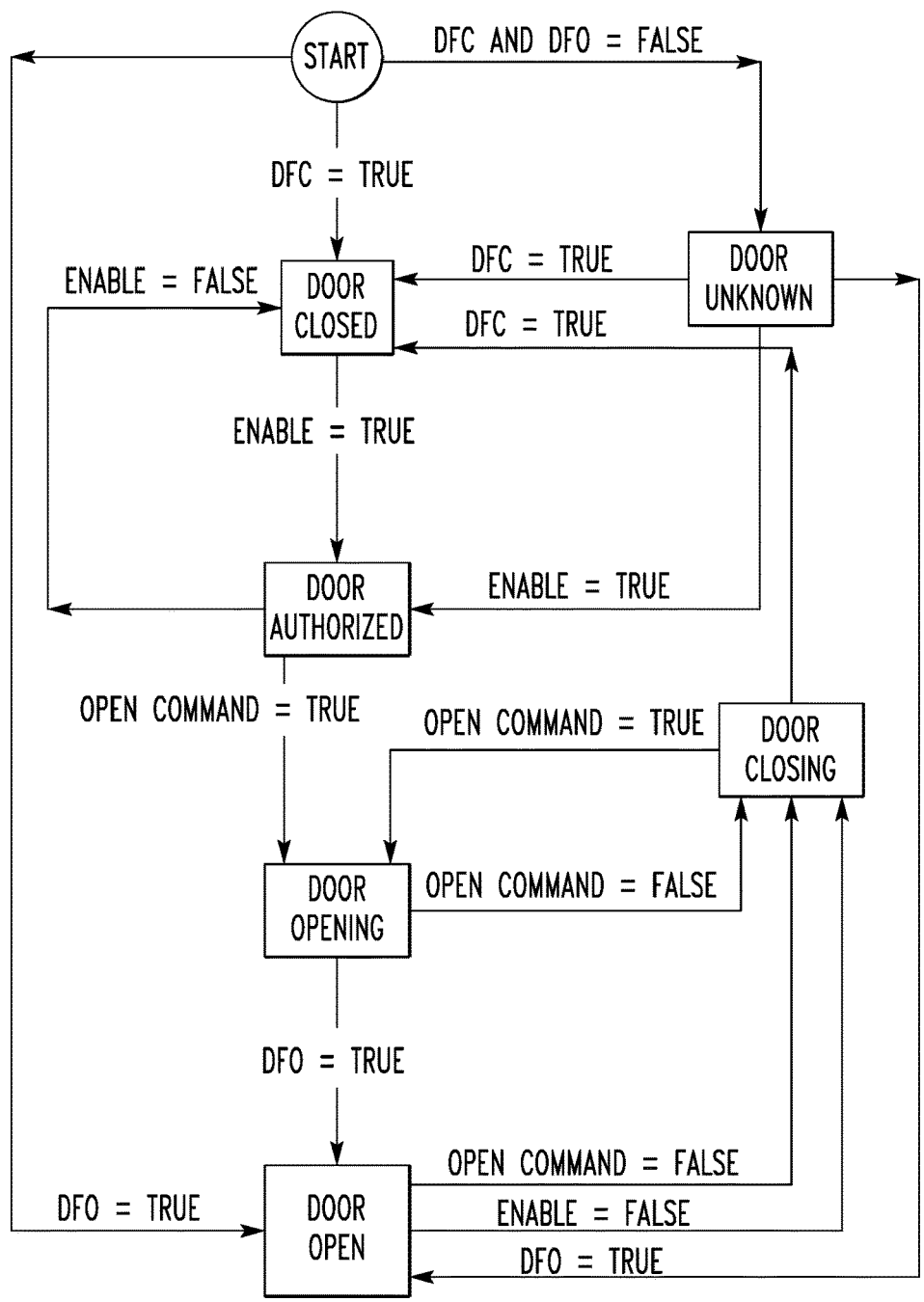
FIG. 7 is a state diagram showing the flow of control and output information.

FIG. 6 illustrates in schematic fashion the relation between a controller 30 and a light display 40, and FIG. 7 illustrates the flow of control and output information to and from the controller 30.

The door open (DFO) and closed (DFC) signals may be provided by mechanical switches that are activated when the door is in the fully open and fully closed positions. The authorize signal provided by the vehicle driver is generated by a switch located adjacent the vehicle driver. The passenger open request signal may be a switch that is sensitive to the touch by the passenger of the touch bar (FIGS. 1-4) or the lens (FIG. 5). The sensitivity to touch may be based on the change in capacitance sensed by the touch bar or lens. All input signals may have associated electronics that output a digital signal appropriate to the input to the controller.

The controller is a microcontroller or microprocessor that is programmed (having a stored program) to select the correct outputs based on the various inputs. FIG. 7 is a state diagram from which the specific computer program code for controlling the microcontroller may be expeditiously derived. The particular program code will depend on the specific microcontroller or computer incorporated.

The simplest lighting display would consist of a red, a green, and a yellow light bulb or two or three colored LEDs. The light may, for example, be presented via light guides or end ejection from optic fibers. In a preferred embodiment, the lighting display includes a microprocessor programmed to respond to outputs from the controller and selects the on/off and intensity of the lights via LED drivers. Typically, the lighting can use two color LEDs, say red and green, which in combination will produce yellow or can use three color LEDs, say red, green, and yellow, which can be produced in various color combinations and intensities. The colors can be the same, or different between combinations of first, second and/or third colors, and the possibility that there could be a $4^{th}$ or $n^{th}$ color as well.

Having thus described the invention and detail required by the patent laws, what is desired protected by Letters Patent is set forth in the following claims.

The invention claimed is:

1. A passenger communication system for a transit vehicle, comprising:
    an interactive display device positioned in close proximity to one or more vehicle doors in an interior of the transit vehicle and adapted to display a visual notification to one or more passengers in the interior of the transit vehicle; and
    a programmable control unit electrically coupled to the interactive display device and adapted to alter the visual notification on the interactive display device to indicate one or more states of the one or more vehicle doors representing at least one of a fully opened state, a fully closed state, or a transition state between the fully opened state and the fully closed state,
    wherein the interactive display device displays a visual notification or provides a darkened display when the one or more vehicle doors are in a fully closed state;
    wherein the visual notification via the interactive display device is a controlled display in a first color when the one or more vehicle doors are authorized by an operator of the transit vehicle for opening or closing;
    wherein the visual notification via the interactive display device is a controlled display in a second color when the one or more vehicle doors are in a fully open state; and
    wherein the visual notification via the interactive display device is a controlled display in a third color when the one or more vehicle doors is in a transition state and at least one passenger of the one or more passengers in the interior of the transit vehicle requests that the vehicle door be opened.

2. The passenger communication system of claim 1, wherein the interactive display device comprises a lighting unit adapted to display at least the first color, the second color, or the third color.

3. The passenger communication system of claim 1, wherein the controlled display on the interactive display device in at least one of the first color, the second color, or the third color may be programmed to display as a continuously ON signal state, an intermittently ON signal state, or a transition between the continuously ON and the intermittently ON signal states.

4. The passenger communication system of claim 3, wherein frequency of intermittency of the intermittently ON signal of the interactive display device is programmable.

5. The passenger communication system of claim 1, wherein the interactive display device is adapted for display on the vehicle door or about the vehicle door.

6. The passenger communication system of claim 2, wherein the lighting unit comprises one or more LED elements, the one or more LED elements configurable to emit light in one or more of the first color, the second color, or the third color.

7. The passenger communication system of claim 1, wherein the display device is configurable to display a textual message to alert the one or more passengers.

8. The passenger communication system of claim 1, wherein the first state of the interactive display device is an OFF state.

9. The passenger communication system of claim 1, wherein the second state of the interactive display device is an ON state.

10. The passenger communication system of claim 1, wherein the interactive display device is a grab handle affixed on the vehicle door.

11. The passenger communication system of claim 2, wherein brightness of light from the lighting unit is configurable to be at zero brightness/intensity, maximum brightness/intensity, or anywhere in between the zero brightness/intensity and maximum brightness/intensity.

12. A method of providing notification to one or more passengers in an interior of a transit bus via a notification system to open a vehicle door on the transit bus, comprising:
receiving an authorized command of an operator of the transit bus at the notification system indicative of when it is safe to open a vehicle door on the transit bus;
notifying to the one or more passengers via an interactive display device controlled by the notification system and mounted in the interior of the transit bus proximate to the vehicle door that the notification system is waiting to receive a passenger input indicative of a need to open the vehicle door, wherein the interactive display device is adapted to provide visual notification of at least one of a readiness to receive passenger input and a confirmation of the passenger input;
opening the vehicle door to allow exit of the one or more passengers upon receiving the passenger input at the interactive display device; and
providing controllable visual notification via the interactive display device to the one or more passengers during the transition of the vehicle door from fully closed position to fully open position.

13. The method of claim 12, comprising:
controlling the visual notification by the interactive display device by altering at least one of duration of the visual notification, color of the visual notification, and intensity of the visual notification.

14. The method of claim 12, comprising:
maintaining the vehicle door in closed position upon failure to receive the passenger input at the interactive display device.

15. A non-transitory computer readable medium containing program instructions for providing notification to one or more passengers in an interior of a transit bus via a notification system to open a vehicle door on the transit bus, wherein execution of the program instructions by one or more processors of a computer system causes the one or more processors to carry out the steps of:
receiving an authorized command of an operator of the transit bus at the notification system indicative of when it is safe to open a vehicle door on the transit bus;
notifying to the one or more passengers via an interactive display device controlled by the notification system and mounted in the interior of the transit bus proximate to the vehicle door that the notification system is waiting to receive a passenger input indicative of a need to open the vehicle door, the interactive display device is adapted to provide visual notification of at least one of a readiness to receive passenger input and a confirmation of the passenger input;
opening the vehicle door safely to allow exit of the one or more passengers upon receiving the passenger input at the interactive display device; and
providing controllable visual notification via the interactive display device to the one or more passengers during the transition of the vehicle door from fully closed position to fully open position.

16. A passenger communication lighting display on or adjacent a touch bar on a passenger door in an interior of a transit vehicle comprising:
a display controlled to display multiple colors continuous or blinking; and
a control means comprising a programmed microcontroller responsive to signals indicating (a) that the door is closed, (b) an operator of the transit vehicle has authorized the door to be opened, (c) a passenger in the interior of the transit vehicle has requested the door be opened, (d) the door is about to open or is opening, (e) the door is about to close or is closing, or (f) the door is resting in the open position, the control means programmed to thereby cause the display to be dark when the door is closed, the display to be a first color when the operator has authorized opening, the display to flash a second color when the passenger in the interior of the transit vehicle has requested the door be opened, the display to be blinking the second color when the door is opening, the display to be continuously the second color when the door is resting in the open position, and the display to be blinking a third color while the door is closing.

17. The lighting display according to claim 16, positioned near or at eye level.

* * * * *